United States Patent
Kaiser (10) Patent No.: US 8,332,358 B2
(45) Date of Patent: Dec. 11, 2012

(54) TRAVERSAL-FREE RAPID DATA TRANSFER

(75) Inventor: Reiner K. Kaiser, Redondo Beach, CA (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 59 days.

(21) Appl. No.: 12/984,656

(22) Filed: Jan. 5, 2011

(65) Prior Publication Data

US 2011/0167037 A1      Jul. 7, 2011

Related U.S. Application Data

(60) Provisional application No. 61/292,186, filed on Jan. 5, 2010.

(51) Int. Cl.
*G06F 17/00* (2006.01)

(52) U.S. Cl. ........ 707/637; 707/624; 707/639; 707/640; 707/661; 707/674

(58) Field of Classification Search ........... 707/999.204, 707/610, 640, 661, 674, 624, 637, 639
See application file for complete search history.

(56) References Cited

U.S. PATENT DOCUMENTS

| | | | |
|---|---|---|---|
| 5,873,075 A | 2/1999 | Cochrane et al. | |
| 6,125,369 A * | 9/2000 | Wu et al. | 707/613 |
| 6,397,125 B1 | 5/2002 | Goldring et al. | |
| 7,127,477 B2 * | 10/2006 | Duncombe et al. | 709/238 |
| 7,401,104 B2 * | 7/2008 | Shah et al. | 707/620 |
| 7,490,112 B1 | 2/2009 | Baumgarten | |
| 8,126,844 B2 * | 2/2012 | Kast | 707/610 |
| 2001/0005849 A1 | 6/2001 | Boothby | |
| 2003/0208511 A1 * | 11/2003 | Earl et al. | 707/204 |
| 2005/0193028 A1 | 9/2005 | Oswalt | |
| 2007/0027936 A1 * | 2/2007 | Stakutis et al. | 707/204 |
| 2008/0077635 A1 * | 3/2008 | Sporny et al. | 707/204 |
| 2008/0109496 A1 * | 5/2008 | Holenstein et al. | 707/204 |
| 2010/0274759 A1 | 10/2010 | Takeuchi et al. | |
| 2011/0179059 A1 * | 7/2011 | Kaiser | 707/769 |
| 2011/0191299 A1 * | 8/2011 | Huynh Huu et al. | 707/646 |

FOREIGN PATENT DOCUMENTS

WO      WO 9806046 A1      2/1998

OTHER PUBLICATIONS

PCT International Search Report dated Jun. 7, 2011 corresponding to PCT Application No. PCT/US2011/020195 filed Jan. 5, 2011 (9 pages).

* cited by examiner

*Primary Examiner* — Dennis Truong (57) ABSTRACT

A system, method, and computer program product for efficient synchronization of data structures. A method includes maintaining a source data structure and a corresponding accountability table in the source data processing system, where at least a portion of the data structure is to be synchronized with a target data structure in a target data processing system. The method includes receiving a synchronization command, and in response to receiving the synchronization command, identifying a first plurality of synchronization objects in the source data structure, using the accountability table, that also exist in the target data structure and have been modified in the target data structure. The method includes identifying a second plurality of synchronization objects in the source data structure that have been newly-created or deleted and that either reference or are referenced by an object in the accountability table.

18 Claims, 4 Drawing Sheets

TRAVERSAL-FREE RAPID DATA TRANSFER

CROSS-REFERENCE TO RELATED APPLICATION

This application claims the benefit of the filing date of U.S. Provisional Patent Application 61/292,186, filed Jan. 5, 2010, which is hereby incorporated by reference.

TECHNICAL FIELD

The present disclosure is directed, in general, to computer aided design, drafting, manufacturing, and visualization systems (individually and collectively, "CAD systems"), product lifecycle (PL) systems, and other related design and manufacturing systems.

BACKGROUND OF THE DISCLOSURE

Transfer of product lifecycle (PL) data includes the transfer of large complex structures. Other data transfers can have the same problem.

SUMMARY OF THE DISCLOSURE

Disclosed embodiments include a system and method that have the ability to synch a large structure without traversal. Various techniques can use triggers which keep track of all new/deleted objects.

Disclosed embodiments include a system, method, and computer program product for efficient synchronization of data structures. A method includes maintaining a source data structure and a corresponding accountability table in the source data processing system, where at least a portion of the data structure is to be synchronized with a target data structure in a target data processing system. The method includes receiving a synchronization command, and in response to receiving the synchronization command, identifying a first plurality of synchronization objects in the source data structure, using the accountability table, that also exist in the target data structure and have been modified in the source data structure. The method includes identifying a second plurality of synchronization objects in the source data structure that have been newly-created or deleted and that either reference or are referenced by an object in the accountability table The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

The figures, illustrations, and examples discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Data transfer of large complex structures is time consuming and takes up a significant bandwidth in a network system. In a multi-sited federation, it can be important for engineers or other users to be able to see recent changes to large data structures such as bill of materials (BOM), for example, as updated and modified in other sites owning their respective data. In general, only a small percentage of a structure changes on a frequent basis, and it is those changes that should be identified and synchronized in the highest possible efficient manner.

Conventional synchronization methodologies perform a data traversal of a structure, investigate all traversed objects and determine whether or not a given object requires update. In general, it is not possible to derive from the state of a parent object whether any of its child objects and subsequent referencers require update. Therefore, this traversal approach is usually expensive with effort more or less proportional to the size of the structure and not the size of the change (which can be very small or even non-existent). Disclosed embodiments provide a distinct technical advantage in more efficient synchronization of data structures.

Figure 1:
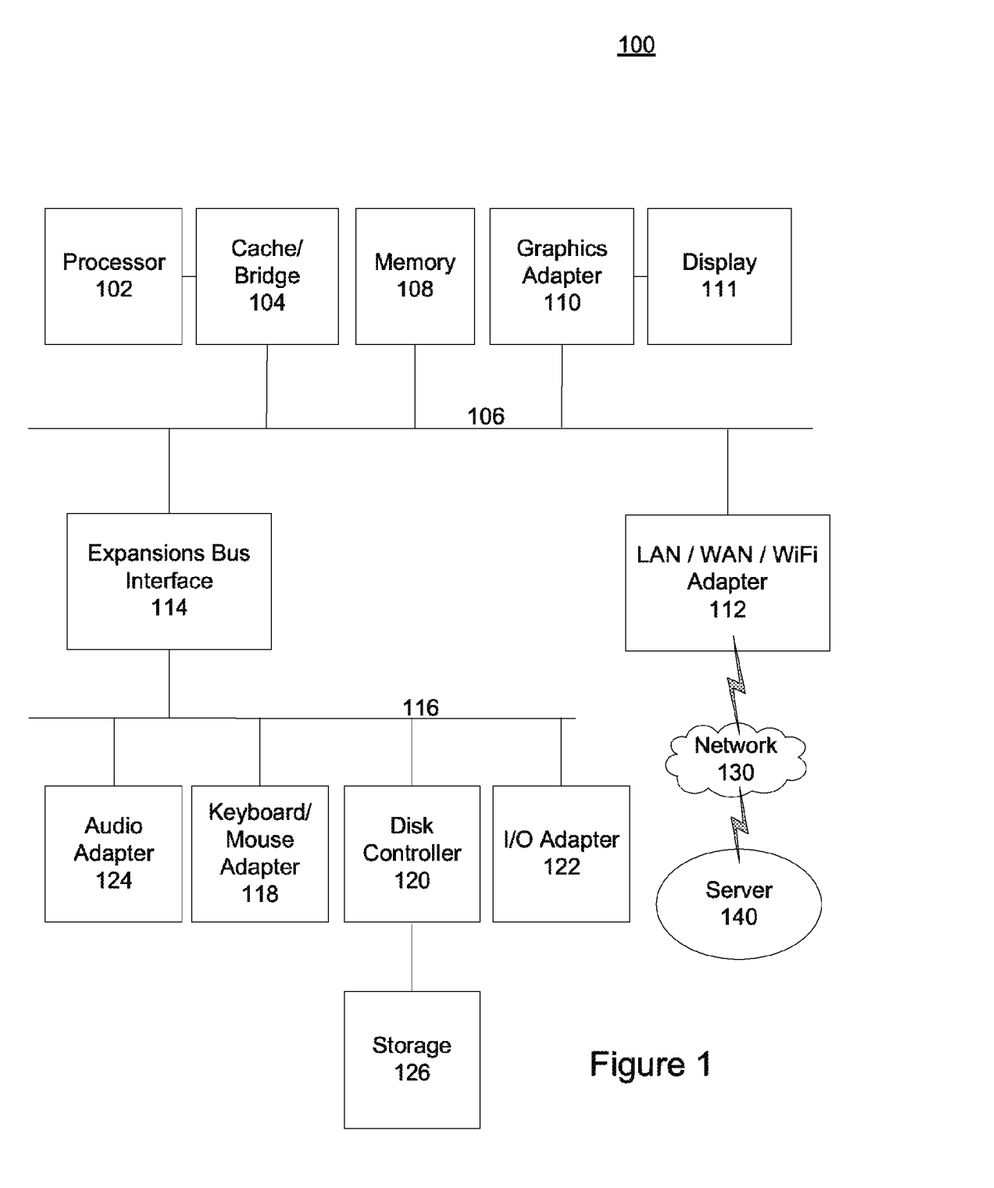
FIG. 1 depicts a block diagram of a data processing system in which an embodiment can be implemented.

FIG. 1 depicts a block diagram of a data processing system in which an embodiment can be implemented. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. Any of the data processing systems 100 described here can be used to store and manipulate the various tables and databases described below. In particular, 2 or more data processing systems 100 or server systems 140 can communicate together to synchronize data as described herein.

Many large manufacturing companies with sites in different countries/continents and close collaboration between sites rely on nightly synch processes to ensure that their respective replicated data at the local sites is up to date on a daily basis. This puts an effective upper limit on the maximum structure size that can still be successfully synched for a given available bandwidth and synchronization process execution time per object. It is therefore important to make this synchronization approach as efficient as possible.

Embodiments disclosed herein have the ability to synch a large structure without traversal, including processes that use triggers which keep track of all new/deleted objects. Various embodiments further analyze these objects based on their connection to the structure.

This is different from an event-based methodology which logs all newly created/updated objects indiscriminately. Instead of traversing a structure and searching for all modified objects since last export took place which is at best O(n) and at worst $O(n^2)$ performance (where n is the number of BOM lines), a new table ("accountability table") is created in the database at the source site which includes references to all objects stored which were transferred to a given site, together with their last_saved_date. In addition, database triggers are put in place which fire every time a new object is created or deleted, and references to these objects can be stored in a "scratch" table at the owning site. These two constructs enable synchronization performance close to O(1). In various embodiments, the accountability table and scratch table can reference objects using a unique identifier "uid" that is associated with each object in the primary data structure.

Figure 2:
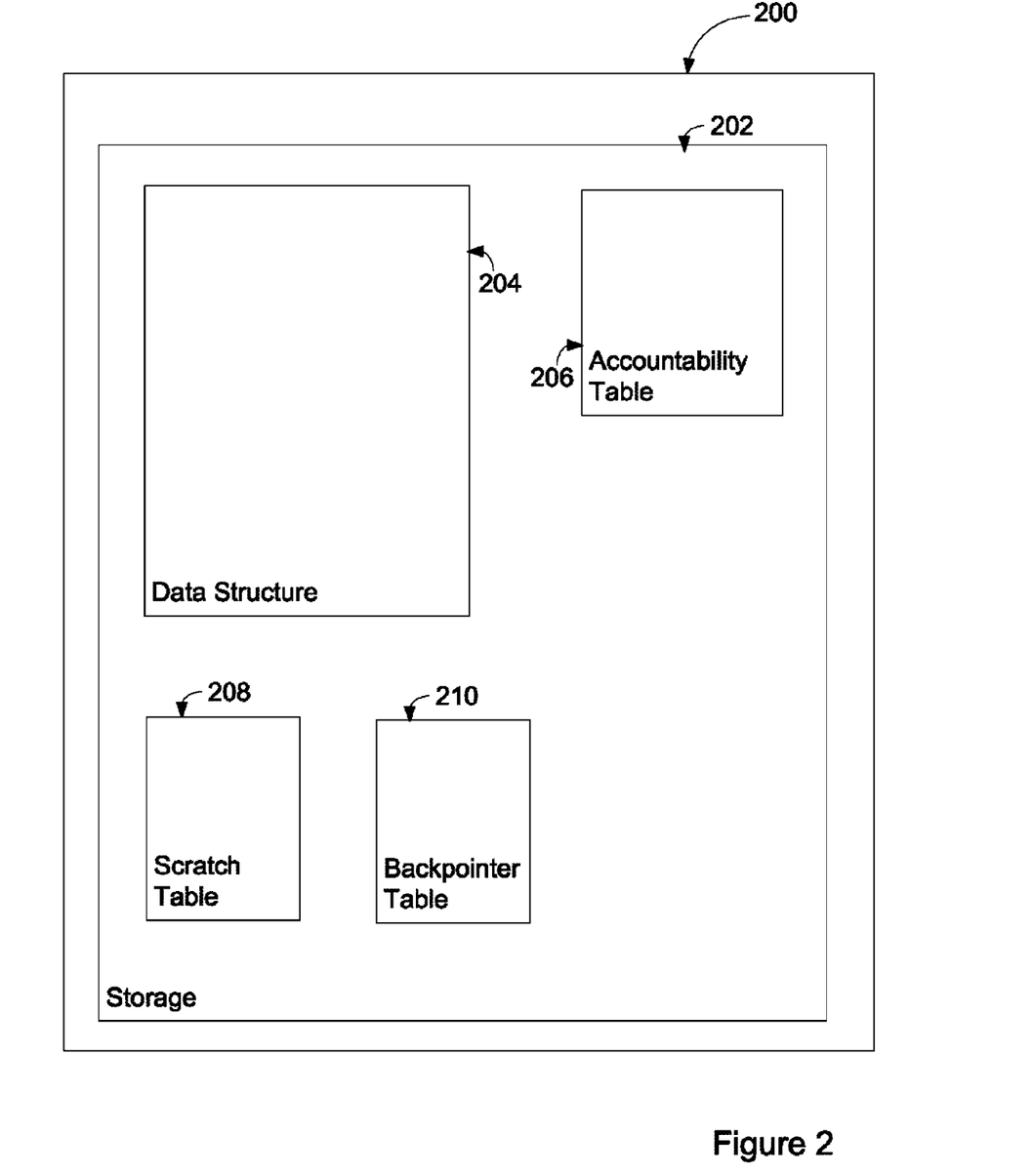
FIG. 2 shows a simplified block diagram of data structures as can be used herein.

FIG. 2 shows a simplified block diagram of data structures as can be used herein, that can be stored in a storage 202 of each data processing system 200 at any site that participates in managing, synchronizing, or working with the data described herein. Other components are omitted in this figure. The system can store data structure 204, which can be any large or small data structure, and in particular implementation is a CAD or product lifecycle management bill of materials (BOM) structure. The system can also store an accountability table 206, and a scratch table 208. The system can also store a backpointer table 210, as described herein, or the data of the backpointer table can be included in the data structure 204, the accountability table 206, or the scratch table 208. Note that in various embodiments, while each participating system will maintain a large structure 204, various systems may or may not store an accountability table 206, a scratch table 208, or the backpointer table 210, as tong as these are accessible either directly or over a network to perform the processes described herein.

Figure 3:
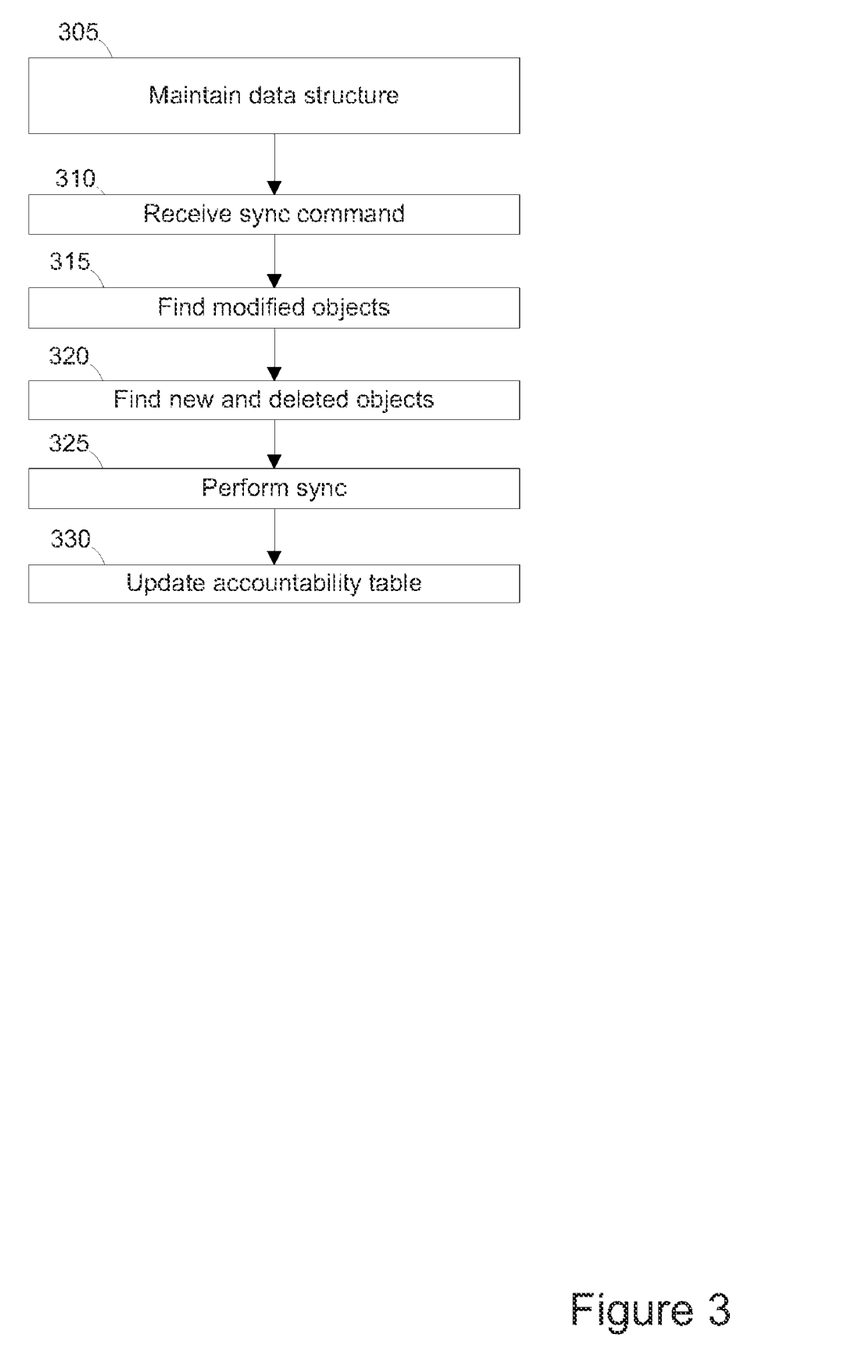
FIGS. 3 and 4 depict flowcharts of processes in accordance with disclosed embodiments.

FIG. 3 depicts a flowchart of a process in accordance with disclosed embodiments, for identification of all objects requiring update for the synchronization operation, and for performing the synchronization operation. Note that the processes for identifying data to be synchronized and the actual synchronization can be performed as a single process or can be performed as separate processes. The various broad steps described with regard to FIG. 3 are also described in more detail below.

Note also that any code examples given below are exemplary only, and those of skill in the art recognize that the disclosed embodiments can be implemented using different code, hardware, software, or firmware. In this example, the processes below are performed by a configured data processing system 100.

The steps below, or corresponding steps, can be performed by any system taking part in the synchronization process, but this exemplary process is described in terms of a source system that maintains a copy of the data structure that is to be synchronized with a target system, and on which the data has been modified by one or more processes or users.

The system maintains a data structure (step 305), and updates it as required by its users and processes, and also maintains a corresponding accountability table. The data structure is typically a very large data structure such as a BUM, but the processes herein can apply to any data structure that includes multiple objects and is to be synchronized. This can include creating and maintaining the triggers, as described below, including during user sessions in which the users are modifying the data in the data structure. At least a portion of the data structure is to be synchronized with a data structure in a target data processing system.

The system receives a synchronization command (step 310). Receiving, as used herein, can include receiving from a user, receiving from another system such as over a network, receiving from a process (such as a scheduler or otherwise), loading from storage, or otherwise. The synchronization command indicates that the system should synchronize the data structure it maintains with a corresponding data structure on a second system.

In response to receiving the synchronization command, and using the accountability table, the system finds all objects that already exist both in its source data structure and the target data structure of the second system but have been modified in the source data structure (step 315); these can be referred to as a first plurality of synchronization objects. This can be performed, for example, by performing a lookup of the accountability table to identify all objects for which the last export or synchronization timestamp is prior to the last saved or modified timestamp. A non-limiting example of such a lookup is as follows:

```
SELECT * FROM ACCOUNTABILITY_TABLE acct,
OBJECT_TABLE obj
WHERE
    acct.uid = obj.uid AND
    acct.last_export_date<obj.last_saved_date
```

The search results can be stored, for example, in the data processing system storage.

The system finds all newly-created or deleted objects which are either referenced by or are referencers of any objects in the accountability table (step 320); these can be referred to as a second plurality of synchronization objects. This operation can be performed recursively and can use a "backpointer" table which keeps track of all referencers, including references between objects of the source data structure. A non limiting example of such a lookup is as follows:

```
SELECT * FROM ACCOUNTABILITY_TABLE acct,
BACKPOINTER bp,
SCRATCH_TABLE scr
WHERE acct.uid=scr.uid AND
    scratch.trigger_condition=TRIGGER_DELETE AND
    (acct.uid = bp.to_uid AND scr.uid = bp.from_uid) OR
    (acct.uid=bp.from_uid AND
        scr.uid = bp.to_uid )
```

A similar query is used for the corresponding newly created objects. This increase of candidate objects can also be validated by traversal closure rules which define whether or not an object belongs to the structure in question. For example, the system can use a forward/backpointer connecting the new object to the structure, but if the new object is outside the scope of navigated relations, it is therefore ignored. As used herein, "closure rules" describe, for each object, which other objects have to be processed, traversed or both, based on dependencies between objects.

The search results can be stored, for example, in the data processing system storage.

The system synchronizes, serializes, or otherwise processes the identified objects (step 325), using conventional techniques, which can include emptying any temporary data storage.

The system updates the accountability table accordingly with the new last_export_date of these objects (step 330).

Using such a process, and in particular the processes for identifying data to be synchronized as broadly described in steps 315 and 320, enables a much more efficient synchronization to take place in step 325, by only synchronizing the identified objects, without traversing or synchronizing the entire data structure.

As an example, in case of an unchanged BUM only two queries are required which will—within split seconds—return the desired result of "nothing to do". Conventional traversal methods of larger BUM structures would require several orders of magnitude more time to arrive at the same result.

Disclosed embodiments provide a solution for the time critical problem of large-scale data synchronization for across-site collaborations where updates to BUM structure must be made available within the federation, even across the world, in a finite time window (of typically eight hours or less). Various embodiments provide an efficient approach for low-chattiness data synchronization and minimize server execution time in doing so.

Various embodiments can be implanted using the SQL database language, described in the SQL/2 standard. ISO, Geneva, Switzerland, 1992. ISO/IEC 9075:1992, hereby incorporated by reference.

As described herein, carious embodiments can update the target site with changes in source site for data that has been already been exported or synchronized. Components of various embodiments can include those discussed below.

In various embodiments, for use in identifying sync candidates at the source site, exported objects are associated with an Export Record (IXR) in the accountability table which keeps information about the last exported date for that object. The sync process (data_sync) compares the last modified date of an instance with the last export date and determines if the object needs to be synchronized.

For the fast sync, the intent is to determine a highly targeted list of potentially out of sync objects at the source site. Synchronization is generally required in the following cases:

Update: A previously exported object is updated at the source site. This essentially means that the last modified date (and/or last saved date) of the object are later than its last export date.

Add: A new object is created at the source site such that it is now part of a previously exported island or set of data and should be synchronized to the target system. An "island" of data, as used herein, refers to a subset of the objects in the data structure that are typically used together, and so it is more efficient to consistently update these objects together.

Delete: An object is deleted at the source site such that it changes the structure of a previously exported island or set of data.

Accountability Table & Database Triggers: An accountability table, in this example, can contain one entry for each object, such as a Persistent Object Manager (POM) object, which has been consolidated to the target site (with or without ownership transfer). The primary functions of the accountability table, in some embodiments, are:

Keeping track of sync state of all replicated objects;
Keeping track of added/deleted objects during normal user operations in the source db;
Final accountability before "flip-the-switch" is executed; and
Two-phase commit: keep track of pending state for replication and ownership transfer.

The accountability table can have the following schema attributes:

| Name | function |
| --- | --- |
| Object_uid | Uid of referenced object |
| Led | Last exported date (date of last export or last sync operation |
| Consolidation_Status | (consolidating, consolidated, trigger_add, trigger_delete, deleted) |
| Pending_state | REPLICATED, TRANSFERRED, REPLICATION_PENDING vs. TRANSFER_PENDING if the system is in the middle of a sync/ownership transfer, i.e. sync confirmation has not yet occurred etc. |

Triggers can be executed by the system for every action in a user session which either newly creates or deletes an object. The triggers can be very simple and not perform any querying to keep them efficient and not degrade the performance of the user's session.

The system can find all updated objects that need to be synched. The process can be performed as a join of the accountability table (ACCT_TABLE in the example below) with the data structure to be synced (POMOBJECT in the example below) such that all objects with a last-saved-date lsd later than the last-export-date led of the accountability table are collected.

```
SELECT * FROM POMOBJECT obj, ACCT_TABLE acct
WHERE   Obj.lsd > acct.led
AND    acct.status == consolidating
```

The system can find deleted objects that impact the sync. The trigger inserts a row in the accountability table for every object deleted from the data structure, in this case the POM Object table. The sync module will execute a query on the accountability table to determine if the deleted object has an affect on a previously exported element. If yes, then that particular Island will be considered a sync candidate.

Note that upon notification of successful import the deleted table rows in the accountability table can be removed because no further action (such as ownership transfer etc.) will be required on them.

Dealing with newly created objects: Any object marked as TRIGGER_ADD is analyzed to see whether it is related to any object in the accountability table. An example of such a query is as follows:

```
SELECT * FROM ACCT_TABLE acct1, ACCT_TABLE acct2,
POM_BACKPOINTER t1
WHERE acct1.status = trigger_add AND acct2.status =
consolidating
AND ( ( acct1.object_uid = POM_BACKPOINTER.from_uid AND
acct2.object_uid=POM_BACKPOINTER.to_uid)
OR    (( acct2.object_uid = POM_BACKPOINTER.from_uid AND
acct1.object_uid=POM_BACKPOINTER.to_uid)
```

This will eliminate rows inserted by the trigger in the accountability table before a new sync occurs by either removing rows that are not related to a previously exported elements in the table or convert them to consolidating, deleted, etc. status.

To improve the fast export and the accountability table, before replication begins with the fast export processes described herein, a sanity check can be performed to check if input principal objects already exist in the accountability table with Consolidating (or higher) status. If so, the system is guaranteed that all secondary objects also exist since traversal rules are assumed to be the same. If so, this can then be communicated to the user and the object can be removed from the list of objects to be explicitly exported. The same is true for any secondary objects encountered during traversal. For example, the system might traverse an assembly which references a subassembly that was already replicated. If so, re-traversal and export is not required, a re-sync will suffice.

In various embodiments, during first-time object replication, all successfully replicated objects are added into the accountability table.

The system can also perform a pre-population of accountability table with results of remotely traversed objects. The source system can be traversing the target database for a given set of source site replica objects and will retrieve a replica structure which, based on customer business practices, may or may not already be in synch and might be synched on a nightly basis. If such replica data is collected at the target site during the preparation phase, it can then be read at the source site and an accountability table can be pre-populated based on this data, without requiring any replicating from source to target. Then, such objects will only require re-synching which is much faster than replicating. This will also help to keep site consolidation replication separate from conventional traversal-based replication and synchronization processes, which is the kind of interference that could cause unnecessary overhead and other concurrency issues.

In various embodiments, the system can also perform a "flip-the-switch" ownership transfer: Ownership transfer happens for all objects in the accountability table at the replica site which have source site ownership. For this purpose, a list of all such objects in the accountability table is generated. Once successful ownership transfer is confirmed by the target site, local ownership (at source site) can either be converted or no action is required in cases where the source data structure will be switched off.

This operation can be initiated at the source site by invoking a component that returns the list of UIDs in the accountability table that requires ownership change. In the next step, an operation can be invoked at the target site that takes the list of UIDs and performs a single a single operation to change the value of the owning_site attribute. Finally, the accountability table at the source site will be updated with the status of the import.

Figure 4:
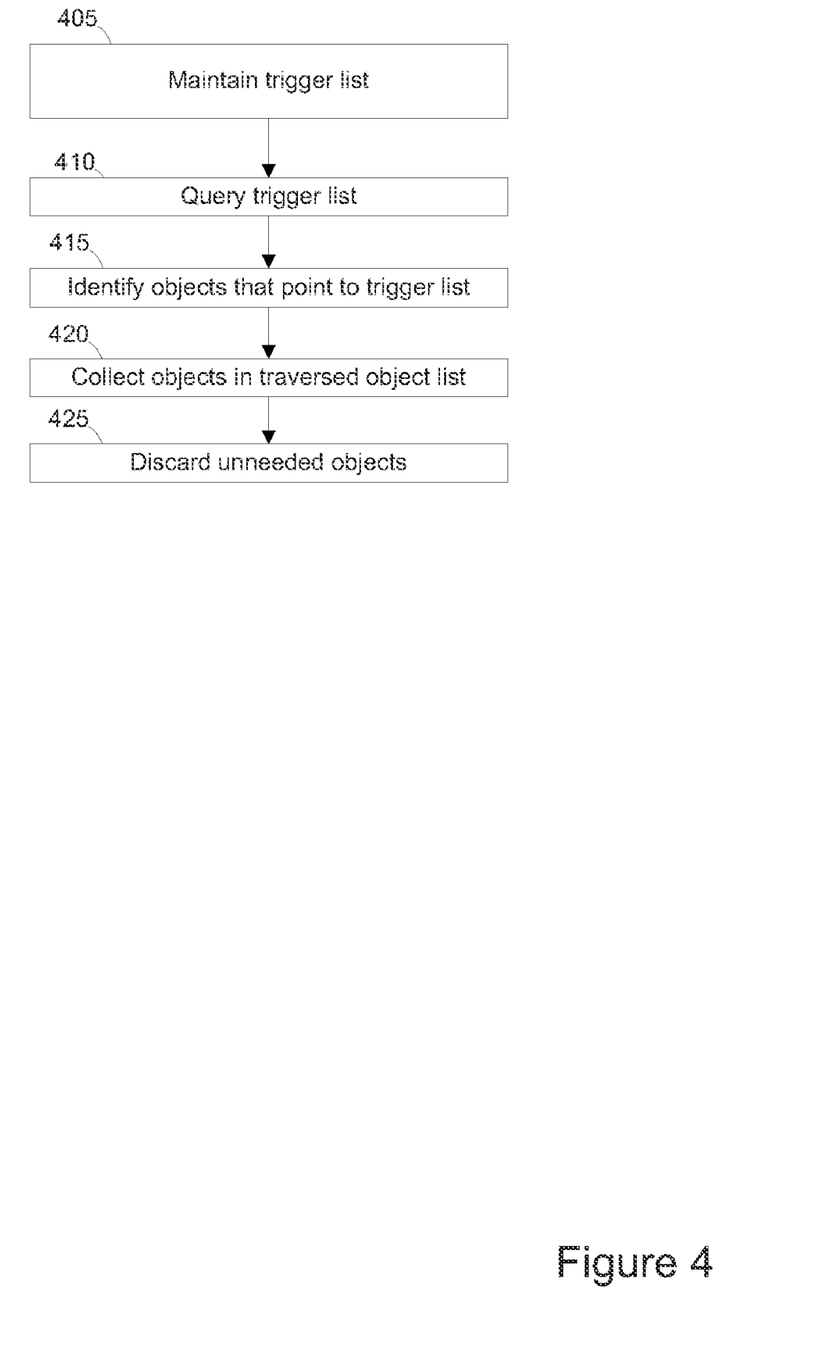

FIG. 4 depicts a process in accordance with disclosed embodiments that can be used for identification of additional objects to be synched. This process can be used as part of step 320 above.

The system maintains and stores a list of trigger-based objects (step 405), some of which may be "related" to the objects in the accountability table.

The system queries all new/deleted objects from trigger list which have a backpointer entry "in" or "out" (step 410). Note that there may be many objects in this result which are undesirable. For example, a user adds subassembly with end item from accountability table to an unrelated assembly, new occurrence references object in accountability table but this is neither needed nor desirable.

For all new trigger object references, the system will identify objects in the accountability table that are pointing to new/deleted trigger objects (step 415).

As part of this step, the system can perform re-traversal. During re-traversal, there are three possible cases. If the new object is in the trigger list, it is added to the accountability table. If the new object is already in the accountability table, the system performs no operation (noop). If the new object is not newly created, it is added to the sync list.

The system collects all objects from trigger list which are in traversed object list (step 420).

The system discards the rest of the new/deleted objects (step 425).

For example: for a new island, e.g., a new occurrence reference and new end item, the system will add objects to accountability table which may not be newly created.

In the processes described herein, various steps may be omitted or performed concurrently, repeatedly, sequentially, or in a different order, unless otherwise specified. Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually early out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is clamed is:

1. A method performed by a source data processing system, comprising:
    maintaining a source data structure and a corresponding accountability table in the source data processing system, at least a portion of the data structure to be synchronized with a target data structure in a target data processing system, wherein database triggers are used to track objects in the source data structure that are deleted or created;
    receiving a synchronization command in the source data processing system;
    in response to receiving the synchronization command, identifying a first plurality of synchronization objects in the source data structure, using the accountability table and timestamps associated with the synchronization objects, that also exist in the target data structure and have been modified in the source data structure;
    identifying a second plurality of synchronization objects in the source data structure that have been newly-created or deleted and that either reference or are referenced by an object in the accountability table according to references between the objects in the source data structure; and
    performing a synchronization process using the identified first plurality of synchronization objects and second plurality of synchronization objects.

2. The method of claim 1, wherein the source data processing system performs the synchronization process without traversing the source data structure, and without traversing the target data structure.

3. The method of claim 1, wherein identifying a first plurality of synchronization objects in the source data structure includes querying the accountability table to identify objects that have a last-saved timestamp that is later than a last-synchronized timestamp.

4. The method of claim 1, wherein identifying a second plurality of synchronization objects uses a backpointer table that tracks references between objects of the source data structure.

5. The method of claim 1, wherein identifying a second plurality of synchronization objects is validated using traversal closure rules that define whether or not each synchronization object belongs to the source data structure.

6. The method of claim 1, wherein the source data processing system thereafter updates the accountability table with a new export timestamp for the first plurality of synchronization objects and the second plurality of synchronization objects.

7. A source data processing system comprising a processor and accessible memory, the source data processing system particularly configured to perform the steps of:
    maintaining a source data structure and a corresponding accountability table in the source data processing system, at least a portion of the data structure to be synchronized with a target data structure in a target data processing system, wherein database triggers are used to track objects in the source data structure that are deleted or created;
    receiving a synchronization command in the source data processing system;
    in response to receiving the synchronization command, identifying a first plurality of synchronization objects in the source data structure, using the accountability table and timestamps associated with the synchronization objects, that also exist in the target data structure and have been modified in the source data structure; and
    identifying a second plurality of synchronization objects in the source data structure that have been newly-created or deleted and that either reference or are referenced by an object in the accountability table according to references between the objects in the source data structure; and
    performing a synchronization process using the identified first plurality of synchronization objects and second plurality of synchronization objects.

8. The source data processing system of claim 7, wherein the source data processing system performs the synchronization process without traversing the source data structure, and without traversing the target data structure.

9. The source data processing system of claim 7, wherein identifying a first plurality of synchronization objects in the source data structure includes querying the accountability table to identify objects that have a last-saved timestamp that is later than a last-synchronized timestamp.

10. The source data processing system of claim 7, wherein identifying a second plurality of synchronization objects uses a backpointer table that tracks references between objects of the source data structure.

11. The source data processing system of claim 7, wherein identifying a second plurality of synchronization objects is validated using traversal closure rules that define whether or not each synchronization object belongs to the source data structure.

12. The source data processing system of claim 7, wherein the source data processing system thereafter updates the accountability table with a new export timestamp for the first plurality of synchronization objects and the second plurality of synchronization objects.

13. A non-transitory computer-readable storage medium encoded with computer-executable instructions that, when executed, cause a source data processing system to perform the steps of:
  maintaining a source data structure and a corresponding accountability table in the source data processing system, at least a portion of the data structure to be synchronized with a target data structure in a target data processing system, wherein database triggers are used to track objects in the source data structure that are deleted or created;
  receiving a synchronization command in the source data processing system;
  in response to receiving the synchronization command, identifying a first plurality of synchronization objects in the source data structure, using the accountability table and timestamps associated with the synchronization objects, that also exist in the target data structure and have been modified in the source data structure;
  identifying a second plurality of synchronization objects in the source data structure that have been newly-created or deleted and that either reference or are referenced by an object in the accountability table according to references between the objects in the source data structure; and
  performing a synchronizationenfified first plurality synchronization objects and second plurality of synchronization objects.

14. The non-transitory computer-readable storage medium of claim 13, wherein the instructions further cause the source data processing system to perform the synchronization process without traversing the source data structure, and without traversing the target data structure.

15. The non-transitory computer-readable storage medium of claim 13, wherein identifying a first plurality of synchronization objects in the source data structure includes querying the accountability table to identify objects that have a last-saved timestamp that is later than a last-synchronized timestamp.

16. The non-transitory computer-readable storage medium of claim 13, wherein identifying a second plurality of synchronization objects uses a backpointer table that tracks references between objects of the source data structure.

17. The non-transitory computer-readable storage medium of claim 13, wherein identifying a second plurality of synchronization objects is validated using traversal closure rules that define whether or not each synchronization object belongs to the source data structure.

18. The non-transitory computer-readable storage medium of claim 13, wherein the instructions further cause the source data processing system to thereafter perform the step of updating the accountability table with a new export timestamp for the first plurality of synchronization objects and the second plurality of synchronization objects.

* * * * *